United States Patent [19]

Hilzinger et al.

[11] Patent Number: 4,727,757

[45] Date of Patent: Mar. 1, 1988

[54] FERRO-MAGNETIC FOIL FOR A TORQUE SENSOR

[75] Inventors: Hans-Rainer Hilzinger, Langenselbold; Hans-Joachim Nilius, Seligenstadt; Michael Friedrichs, Hanau, all of Fed. Rep. of Germany

[73] Assignee: Vacuumschmelze GmbH, Fed. Rep. of Germany

[21] Appl. No.: 14,537

[22] Filed: Apr. 3, 1987

Related U.S. Application Data

[62] Division of Ser. No. 837,815, Mar. 10, 1986, Pat. No. 4,703,550.

[30] Foreign Application Priority Data

Mar. 16, 1985 [DE] Fed. Rep. of Germany ....... 3509552

[51] Int. Cl.$^4$ ............................................. G01L 3/10
[52] U.S. Cl. ................................. 73/862.36; 428/611
[58] Field of Search .................. 73/862.36, DIG. 2; 324/209; 148/304; 428/573, 611

[56] References Cited

U.S. PATENT DOCUMENTS

| 3,947,296 | 3/1976 | Kumazawa | 148/111 |
| 4,322,481 | 3/1982 | Krause | 428/573 X |
| 4,414,855 | 11/1983 | Iwasaki | 73/862.36 |
| 4,506,554 | 3/1985 | Blomkvist et al. | 73/862.36 |

FOREIGN PATENT DOCUMENTS 1900194 7/1970 Fed. Rep. of Germany ... 73/862.36

Primary Examiner—Charles A. Ruehl

[57] ABSTRACT

A torque sensor has a magnetic foil which is wound and attached to a rotating shaft in strip form at an angle to the shaft axis of rotation, the magnetic strip being mechanically stressed dependent upon the torque acting on the shaft, and generating voltages in two secondary windings surrounding the magnetic strips. The voltages will be different due to different forces acting on the two strips, this being a measure of the torque acting on the shaft. The strips are formed from stamped segments cut obliquely from an amorphous tape which is cast with a profiled cross-machine cross section having regions of varying thickness. Such a tape can be manufactured using a nozzle having a correspondingly shaped orifice opening through which molten amorphous alloy is discharged onto a moving cooling surface.

9 Claims, 8 Drawing Figures

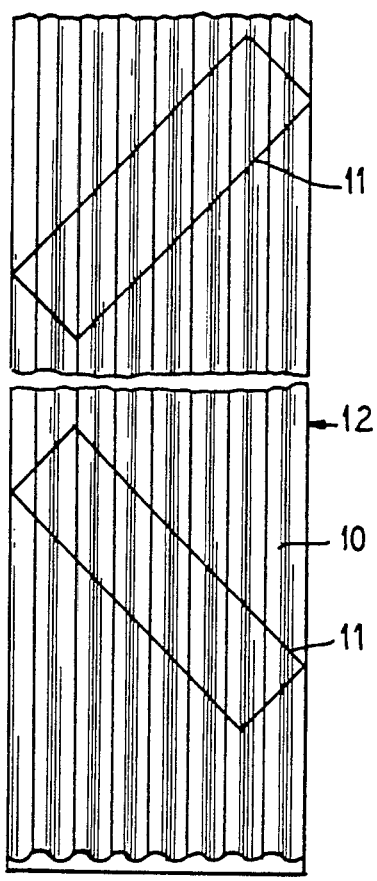
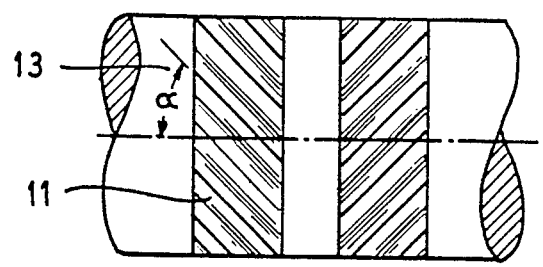
FIG. 3
FIG. 4

FERRO-MAGNETIC FOIL FOR A TORQUE SENSOR

This is a division, of application Ser. No. 837,815, filed 3/10/86, U.S. Pat. No. 4,703,550.

BACKGROUND OF THE INVENTION

1. Field of the Invention

The present invention relates to a torque sensor and a ferro-magnetic foil therefore, and a method for manufacturing such a torque sensor.

2. Description of the Prior Art

Torque sensors are known, for example, as described in IEEE Transactions On Magnetics, Vol. Mag 20, September 1984, pages 942-947 and 951-953, having a strip of magnetostrictive amorphous material firmly secured to the circumference of a rotatable shaft, surrounded by primary and secondary electrical windings. The strips of amorphous material are glued to the circumference of the shaft spaced from each other and disposed at an angle of 45° relative to the axis of rotation of the shaft. The shaft is concentrically surrounded by an excitation coil an two secondary coils. The voltages generated in the secondary coils can be compared and evaluated, for example, in a bridge circuit. A signal substantially proportional to the torque acting on the shaft is thus obtained. This signal is dependent on the torque because the torque deforms the shafts, and the strips attached thereto, and the magnetic properties of the ferro-magnetic material comprising the strips is changed when the strips are subjected to a mechanical stress.

SUMMARY OF THE INVENTION

It is an object of the present invention to provide a ferro-magnetic foil for a torque sensor wherein the application of the foils is substantially simplified.

It is a further object of the present invention to provide a ferro-magnetic foil for a torque sensor which reduced the phenomenon of rotational modulation.

A further object of the present invention is to provide a torque sensor having a ferro-magnetic foil constructed in accordance with the principles of the present invention.

Another object of the present invention is to provide a method for manufacturing a ferro-magnetic foil suitable for use in a torque sensor consistent with the other above objects.

The above objects are inventively achieved in a ferro-magnetic foil having a cross-machine profile with varying thickness. At least one such foil is wound in a closed or substantially closed ring on a shaft, with the regions or varying thickness being disposed at a selected angle with respect to the axis of rotation of the shaft. The strip of amorphous material can be manufactured by discharging molten amorphous alloy contained in a crucible through an orifice shaped to produced the desired cross-section onto a moving chill surface so that the molten alloy rapidly solidifies into a hardened amorphous tape. The "ridges" and "valleys" formed by the selected nozzle shape extend in the machine direction, and strips of suitable size are cut or stamped at an angle with respect to the machine direction, so that the cut strips have the areas of varying thickness proceeding obliquely thereon. The strips are wound on the shaft whose torque is to be measured so that the ridges and valleys are disposed at an angle with respect to the axis of rotation of the shaft.

This structure considerably reduces rotational modulation, which can falsify the torque measurement signal. Rotational modulation is the dependency of, or change in, the signal obtained for the torque with respect to the angular position of the shaft. Rotational modulation is significantly diminished in the torque sensor disclosed herein, using the amorphous foil also disclosed herein, by placing one or more substantially closed rings of the amorphous ferro-magnetic foil around the shaft and firmly connecting the foils thereto. A further reduction in the dependency of the signal on interferring influences resulting from the presence of closely adjacent parts, which are influenced by the magnetic fields of the torque sensor, can be achieved by a selected arrangement of short circuit rings.

DESCRIPTION OF THE DRAWINGS

FIG. 3 is a plan view of a portion of tape manufactured in accordance with the principles of the present invention showing the location of strips for a torque sensor constructed in accordance with the principles of the present invention to be taken therefrom.

FIG. 4 shows the arrangement of two amorphous strips on a shaft in a torque sensor constructed in accordance with the principles of the present invention.

DESCRIPTION OF THE PREFERRED EMBODIMENTS

A method suitable for manufacturing ferro-magnetic foil of the type disclosed herein is described, for example, in U.S. Pat. No. 4,386,648. According to this method, tape is produced from a melt by casting through an essentially rectangular nozzle opening or orifice onto a moving cooling surface. The pressure of the melt, which consist of the static pressure of the molten alloy and, under certain conditions, a gas pressure acting on the surface of the melt, is selected such that the melt has an extension on the cooling surface in the moving direction of the cooling surface which corresponds to the spacing between the inside edges of the nozzle orifice.

Figure 1:
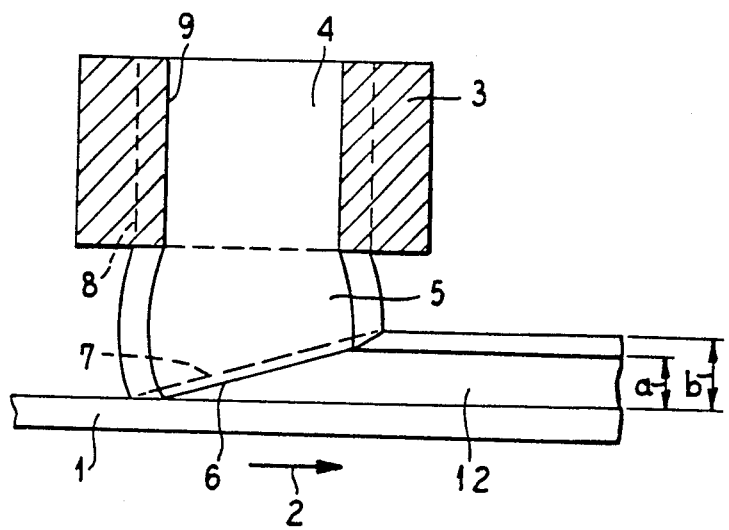
FIG. 1 is a side view, partly in section, of a method for manufacturing amorphous strip for use in a torque sensor in accordance with the principles of the present invention.

Such a method for use in the context of the present invention is shown in FIG. 1. A cooling surface 1, for example a copper drum, moves in the direction of the arrow 2 beneath a nozzle 3. Molten metal alloy, such as amorphous alloy, is contained in a crucible (not shown) disposed above the nozzle 3, and streams through the aperture 4 of the nozzle 3, forming a liquid drop 5 on the cooling surface 1. This drop 5 is in contact with the cooling surface 1 and thus solidification fronts 6 and 7 are formed. Two solidification fronts are formed because of the specifically selected shape of the aperture 4 by means of which a tape having varying thickness in the cross-machine direction is produced.

Figure 2:
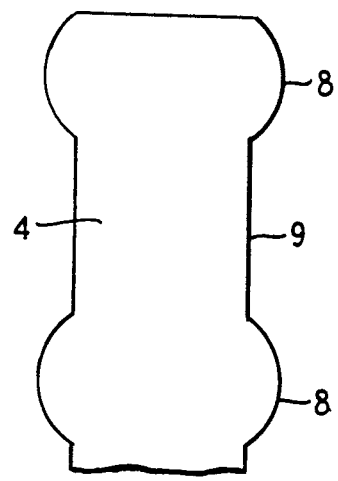
FIG. 2 is a plan view of the nozzle opening (orifice) for the apparatus shown in FIG. 1.

As shown in FIG. 2, the aperture or orifice 4 of the nozzle 3 is generally rectangular, but has enlarged portions 8 at spaced distances from each other along the cross-machine direction. The enlarged portions 8 are separated by intervening narrower regions 9. Different dimensions of the liquid drop 5 in the direction of the arrow 2 are thus obtained perpendicular to the cooling surface 1 along the tape, with the solidification front 6 arising in the narrow regions and the solidification front 7 arising in the regions of enlarged thickness. As a result, the thickness of the tape varies along the width of the tape between a value a and a value b.

Figure 1A:
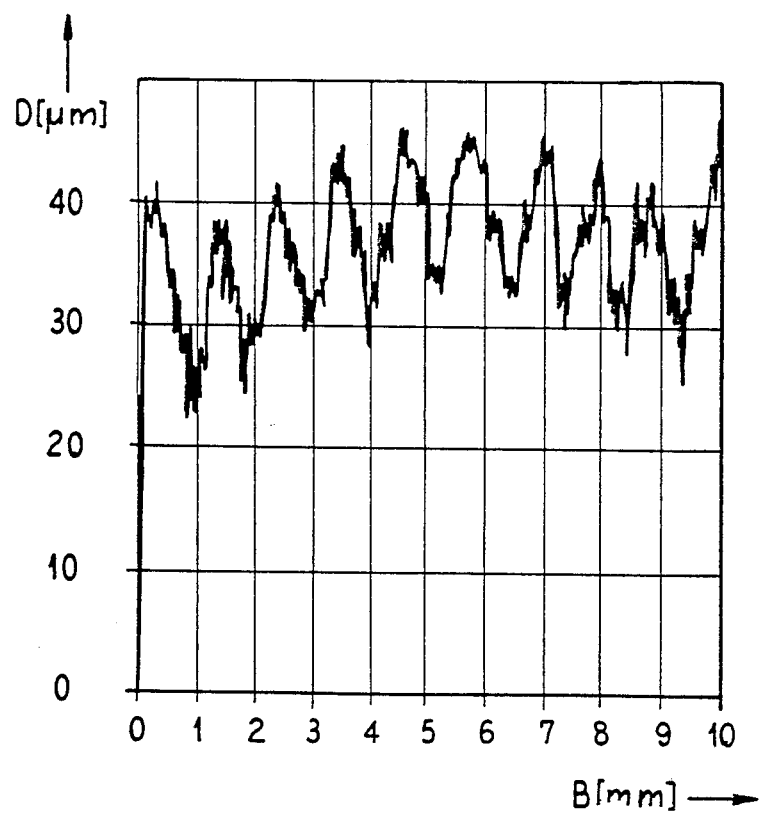
FIG. 1a is a graph showing the thickness D of the tape manufactured in the apparatus shown in FIG. 1 across the width B of the tape.

The graph in FIG. 1a shows the thickness D of the tape in $\mu$m entered on the vertical axis and the width B of the tape in millimeters entered along the horizontal axis. As can be seen, the regions of greater thickness have a spacing of approximately 1 mm, and can thus be substantially uniformly distributed over the circumference of a shaft as described below.

A portion of a tape produced in accordance with the method described above is shown in FIG. 3. The thicker regions 10 are shown shaded. Stamped parts 11 can be cut from this material in the form of rectangle or parallelogram punched from the tape 12. The longer cut edges proceed at an angle between 0° and 90° relative to the longitudinal (machine direction) axis of the tape 12. The strips 11 are magnetized and, as shown in FIG. 4, wound around the circumference of a shaft 13 and firmly attached thereto. The shaft 13 is subjected to torque during operation, and as a result of the thickness fluctuations of the strips 11, a magnetically preferred or priviledged direction occurs. The fluctuations make the tape 12 easier to magnetize. The ridges 10 when the strip 11 is wound on the shaft 13 proceed at an angle $\alpha$ betwee, and, 50°, 40° preferably 45°, relative to the axis of rotation of the shaft 13. This arrangement permits a large number of more easily magnetized strips to be distributed over the circumference of the shaft 13. As a result, the rotational modulation of the signal is considerably diminished. The stamped strip 11 must be secured on the circumference of the shaft 13 perpendicular to the axis of rotation of the shaft. Preferably the length of the stamped strip 11 is selected so as to correspond either to the circumference of the shaft, or a portion thereof.

Figure 5:
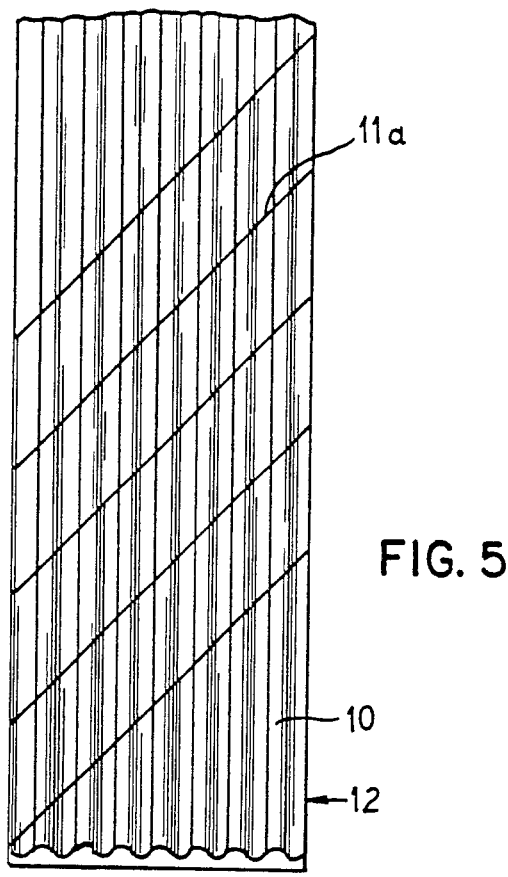
FIG. 5 is a plan view of a segment of an amorphous tape constructed in accordance with the principles of the present invention showing a further arrangement of strips to be taken therefrom.
Figure 6:
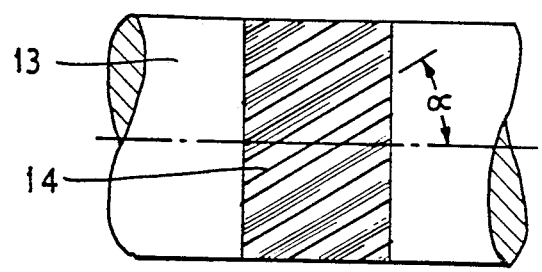
FIG. 6 shows another arrangement of an amorphous strip on a shaft in a torque sensor constructed in accordance with the principles of the present invention.

A tape 12 having parallelogram stamped strips 11a is shown in FIG. 5 with the strips 11a being obtained simply by diagonally cutting the tape 12. In comparison to the rectangular stamped strips 11 shown in FIG. 3, the strips 11a of FIG. 5 have abutting edges 14, as shown in FIG. 6, which are disposed parallel to the changes in thickness of the strip, and function as one of the reduced cross-section areas. For larger diameter shafts, a plurality of such strips 11a may be used in order to place a ferro-magnetic foil completely around the circumference of the shaft 13.

The strips 11 or 11a are cut from the tape 12 at an angle between 0° and 90° with respect to the machine-direction axis of the tape 12.

Figure 7:
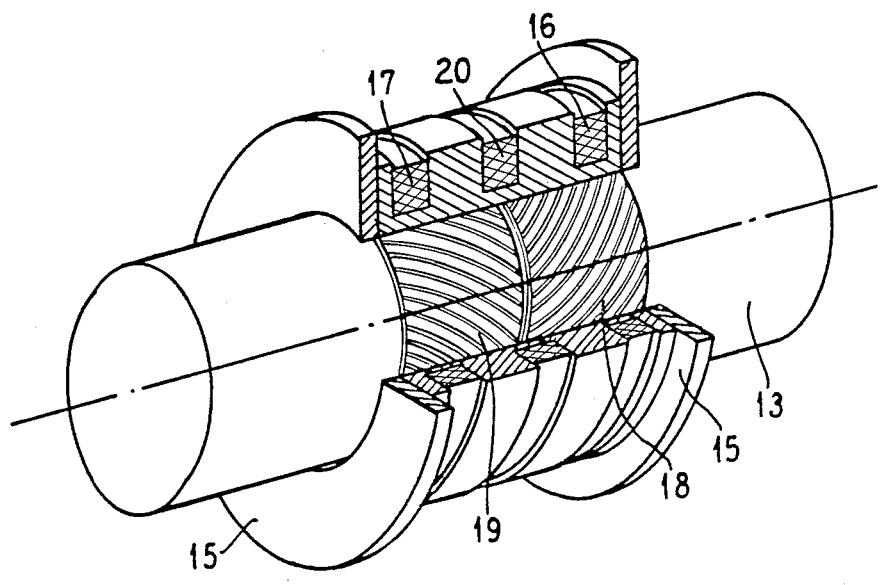
FIG. 7 is a perspective view, with a quarter-section removed, of a torque sensor constructed in accordance with the principles of the present invention.

A reduction of interferring influences which may be caused by other components disposed in the proximity of the torque sensor can be achieved by the use of short circuit rings 15, as shown in FIG. 7. The short circuit rings 15 are disposed around the shaft 13, at both sides of secondary windings 16 and 17, which surround the ferro-magnetic foils 18 and 19 having varying thickness regions as described above. A primary winding 20 provides a.c. excitation and is disposed between the secondary windings 16 and 17. For use in environments particularly susceptible to interference, it is also possible to provide a shielding housing around the entire winding arrangement.

Although modifications and changes may be suggested by those skilled in the art it is the intention of the inventors to embody within the patent warranted hereon all changes and modifications as reasonably and properly come within the scope of their contribution to the art.

We claim as our invention:

1. A ferro-magnetic foil for use on a shaft of a torque sensor having an axis of rotation comprising:
a magnetostrictive amorphous strip section, said strip section being stamped from a larger amorphous strip having a plurality of cast periodic thickness variations across a width of said larger strip extending longitudinally along said larger strip, said strip section having spaced edges with said thickness variations running obliquely therebetween such that upon attachment of said strip section in a ring around a circumference of said shaft, said thickness variations are disposed at an angle between 0° and 90° with respect to said axis of rotation of said shaft.

2. A ferro-magnetic foil as claimed in claim 1 wherein said strip section is stamped from said larger strip such that upon attachment in a ring around said circumference of said shaft, said thickness variations are disposed at an angle between 40° and 50° with respect to said axis of rotation of said shaft.

3. A ferro-magnetic foil as claimed in claim 1 wherein said strip section is stamped from said larger strip such that upon attachment in a ring around said circumference of said shaft, said thickness variations are disposed at an angle of 45° with respect to said axis of rotation of said shaft.

4. A ferro-magnetic foil as claimed in claim 1 wherein said strip section has a parallelogram shape.

5. A torque sensor comprising:
a shaft subject to torque rotatable about an axis of rotation;
respectively primary and secondary electrical windings spaced from and surrounding said shaft; and
at least one magnetostrictive amorphous strip section stamped from a larger strip, said larger strip having a plurality of cast periodic thickness variations across a width of said larger strip extending longitudinally along said strip, and said stamped section being attached in a ring around a circumference of said shaft with said thickness variations disposed at an angle between 0° and 90° with respect to said axis of rotation of said shaft.

6. A torque sensor as claimed in claim 5 wherein said stamped section is attached in a ring around said circumference of said shaft with said thickness variations disposed at an angle between 40° and 50° with respect to said axis of rotation of said shaft.

7. A torque sensor as claimed in claim 5 wherein said stamped section is attached in a ring around said circumference of said shaft with said thickness variations disposed at an angle of 45° with respect to said axis of rotation of said shaft.

8. A torque sensor as claimed in claim 5 comprising a plurality of said stamped section disposed end-to-end for completely surrounding the full circumference of said shaft.

9. A torque sensor as claimed in claim 5 comprising two of said stamped section disposed side-by-side each surrounding a circumference of said shaft.

* * * * *